US012018572B2

(12) United States Patent
Golden et al.

(10) Patent No.: US 12,018,572 B2
(45) Date of Patent: Jun. 25, 2024

(54) CMAS RESISTANT ENVIRONMENTAL BARRIER COATING SYSTEM

(71) Applicant: Rolls-Royce Corporation, Indianapolis, IN (US)

(72) Inventors: Robert Alexander Sean Golden, Indianapolis, IN (US); Adam Lee Chamberlain, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 17/350,827

(22) Filed: Jun. 17, 2021

(65) Prior Publication Data

US 2021/0396150 A1 Dec. 23, 2021

Related U.S. Application Data

(60) Provisional application No. 63/041,596, filed on Jun. 19, 2020.

(51) Int. Cl.
*F01D 25/00* (2006.01)
*C04B 41/52* (2006.01)
(Continued)

(52) U.S. Cl.
CPC ............ *F01D 25/005* (2013.01); *C04B 41/52* (2013.01); *C04B 41/89* (2013.01); *F01D 5/288* (2013.01);
(Continued)

(58) Field of Classification Search
None
See application file for complete search history.

(56) References Cited

U.S. PATENT DOCUMENTS

| 9,890,089 B2 | 2/2018 | Kirby et al. |
| 2006/0014029 A1 | 1/2006 | Saak et al. |

(Continued)

FOREIGN PATENT DOCUMENTS

| EP | 1044947 A2 | 10/2000 |
| EP | 2918698 A1 | 9/2015 |

(Continued)

OTHER PUBLICATIONS

Response to Extended Search Report dated Nov. 15, 2022, from counterpart European Application No. 21180238.4 filed Jun. 20, 2022, 67 pp.

(Continued)

*Primary Examiner* — Kim S. Horger
(74) *Attorney, Agent, or Firm* — Shumaker & Sieffert, P.A.

(57) ABSTRACT

An article may include a substrate and a coating system on the substrate. The coating system may include an environmental barrier coating (EBC) layer and a CMAS resistant layer on the EBC layer (e.g., as the top coat of the system). The CMAS layer includes a rare-earth (RE) monosilicate composition including a plurality of RE metal cations, wherein RE monosilicate composition is configured to react with CMAS to form a reaction product including a RE apatite phase with a $RE_2O_3 \cdot SiO_2$ composition, wherein the RE of the $RE_2O_3 \cdot SiO_2$ composition includes at least one of the plurality of RE metal cations of the RE monosilicate.

10 Claims, 5 Drawing Sheets

(51) Int. Cl.
  C04B 41/89    (2006.01)
  F01D 5/28     (2006.01)
  F02K 1/82     (2006.01)
(52) U.S. Cl.
  CPC .............. *F01D 25/007* (2013.01); *F02K 1/82* (2013.01); *F05D 2300/6033* (2013.01); *F05D 2300/611* (2013.01)

(56) References Cited

U.S. PATENT DOCUMENTS

| | | | |
|---|---|---|---|
| 2006/0078750 | A1 | 4/2006 | Zhu et al. |
| 2006/0121293 | A1 | 6/2006 | Boutwell et al. |
| 2010/0080984 | A1 | 4/2010 | Lee |
| 2010/0159261 | A1 | 6/2010 | Kirby et al. |
| 2011/0033630 | A1* | 2/2011 | Naik ............... C04B 41/009 427/452 |
| 2011/0203281 | A1 | 8/2011 | Sarrafi-Nour et al. |
| 2013/0136915 | A1* | 5/2013 | Naik ............... C04B 41/009 427/419.7 |
| 2013/0189531 | A1* | 7/2013 | Lee ............... C09D 5/18 428/448 |
| 2014/0255680 | A1 | 9/2014 | Lee et al. |
| 2014/0261080 | A1 | 9/2014 | Lee |
| 2016/0003092 | A1 | 1/2016 | Chamberlain et al. |
| 2017/0022113 | A1 | 1/2017 | Opila |
| 2017/0044930 | A1 | 2/2017 | Luthra et al. |
| 2018/0037515 | A1 | 2/2018 | Matsumoto et al. |
| 2018/0363476 | A1 | 12/2018 | Hafner et al. |
| 2018/0370862 | A1 | 12/2018 | Kirby et al. |
| 2019/0284673 | A1 | 9/2019 | Landwehr et al. |
| 2020/0123071 | A1 | 4/2020 | Ndamka et al. |
| 2020/0199027 | A1 | 6/2020 | Chamberlain et al. |
| 2021/0395099 | A1 | 12/2021 | Golden et al. |

FOREIGN PATENT DOCUMENTS

| | | | |
|---|---|---|---|
| EP | 3130577 | A1 | 2/2017 |
| EP | 3243809 | A1 | 11/2017 |
| EP | 3243925 | A1 | 11/2017 |
| EP | 3670481 | A1 | 6/2020 |
| WO | 2020047278 | A1 | 3/2020 |

OTHER PUBLICATIONS

Richards, "Ytterbium Silicate Environmental Barrier Coatings," Dissertation Presented to the Faculty of the School of Engineering and Applied Science University of Virginia, May 2015, 322 pp.
Rost et al., "Entropy-Stabilized Oxides," Nature Communications, Sep. 29, 2015, 8 pp.
Turcer et al., "Towards Multifunctional Thermal Environmental Barrier Coatings (TEBCs) Based on Rare-Earth Pyrosilicate Solid-Solution Ceramics," Scripta Materialia, vol. 154, May 20, 2018, 7 pp.
Costa et al., "Mass Spectrometric Measurements of the Silica Activity in the Yb2O3—SiO2 System and Implications to Assess the Degradation of Silicate-Based Coatings in Combustion Environments," Journal of the European Ceramic Society, Aug. 2015, 9 pp.
Han et al., "Study on Water Vapor Corrosion Resistance of Rare Earth Monosilicates RE2SiO5 (RE [ Lu, Yb, Tm, Er, Ho, Dy, Y, and Sc) From First-Principles Calculations," Elsevier, vol. 4, Oct. 10, 2018, 13 pp.
Zheng et al., "Theoretical and Experimental Determination of the Major Thermo-Mechanical Properties of RE2SiO5 (RE=Tb, Dy, Ho, Er, Tm, Yb, Lu, and Y) for Environmental and Thermal Barrier Coating Applications," Journal of the European Ceramic Society, vol. 36, Jan. 2016, pp. 189-202.
He, "Rapid Thermal Conductivity Measurement with a Hot Disk Sensor Part 1. Theoretical Considerations," Thermochimica Acta, vol. 436, No. 1, Oct. 2005, pp. 122-129.
Cahill, "Thermal Conductivity Measurement From 30 to 750 K: the 3£0 Method," Review of Scientific Instruments, vol. 61, No. 2, Feb. 1990, pp. 802-808.
Hull, "Accuracy, Precision, and Confidence in X-ray Fluorescence for Positive Material Identification," The NDT Technician, vol. 16, No. 1, Jan. 2017, 6 pp.
Lee et al., "Rare Earth Silicate Environmental Barrier Coatings for SiC/SiC Composites and Si3N4 Ceramics," Journal of the European Ceramic Society, vol. 25, Dec. 2005, pp. 1705-1715.
Nan et al., "Effective Thermal Conductivity of Particulate Composites with Interfacial Thermal Resistance," Journal of Applied Physics, vol. 81, No. 10, May 15, 1997, pp. 6692-6699.
Sun et al., "Thermal Properties of Single-Phase Y2SiO5," Journal of the European Ceramic Society, vol. 29, Mar. 2009, pp. 551-557.
Gild et al., "High-Entropy Fluorite Oxides," Journal of the European Ceramic Society, vol. 38, Apr. 2018, pp. 3578-3584.
Gild et al., "A High-Entropy Silicide: (Mo0.2Nb0.2Ta0.2Ti0.2W0. 2)Si2," Journal of Materiomics, Version 1.0, Feb. 3, 2019, 14 pp.
Ramasamy et al., "EBC Development for Hot-Pressed Y2O3/Al2O3 Doped Silicon Nitride Ceramics," Materials Science and Engineering: A-Structural Materials Properties Microstructure and Processing, vol. 527, Aug. 20, 2010, 8 pp.
Hiu et al., "Phase Evolution of Reactive Sputtering Synthesized Holmium Silicate Coatings," Journal of the American Ceramic Society, vol. 102, Jul. 6, 2018, 8 pp.
Ridley et al., "Tailoring Thermal Properties of EBCs in High Entropy Rare Earth Monosilicates," Acta Materialia, Manuscript No. A-20-88, Jan. 6, 2020, 31 pp.
Ridley et al., "Tailoring Thermal Properties of Multi-Component Rare Earth Monosilicates," Acta Materialia, vol. 195, Aug. 2020, pp. 698-707.
Ochrombel et al. "Thermal Expansion of EB-PVD Yttria Stabilized Zirconia," Journal of the European Ceramic Society, vol. 30, No. 12, Sep. 2010, pp. 2491-2496.
Al Nasiri et al., "Thermal Properties of Rare-Earth Monosilicates for EBC on Si-Based Ceramic Composites," Journal of the American Ceramic Society, vol. 99, No. 2, Feb. 2016, pp. 589-596.
Extended Search Report from counterpart European Application No. 121180238.4 dated Nov. 15, 2021, 9 pp.
Ren Xiaomin et al: "Equiatomic quaternary (Y1/4Ho1/4Er1/4Yb1/4)2SiO5silicate: A perspective multifunctional thermal and environmental barrier coating material". Scripta Materialia. vol. 168. Apr. 24, 2019 (Apr. 24, 2019). pp. 47-50.
Tian Zhi Lin et al: "General trend on the phase stability and corrosion resistance of rare earth monosilicates to moltencalcium-magnesium-aluminosilicate at 1300oC," Corrosion Science. vol. 148. Mar. 1, 2019 (Mar. 1, 2019). pp. 281-292.
Office Action from U.S. Appl. No. 16/723,675 dated Jul. 15, 2022, 8 pp.
Response to Final Office Action dated Oct. 31, 2022 from U.S. Appl. No. 16/723,675, filed Jan. 3, 2023, 11 pp.
Final Office Action from U.S. Appl. No. 16/723,675 dated Oct. 31, 2022, 10 pp.
Response to Office Action dated Jul. 15, 2022 from U.S. Appl. No. 16/723,675, filed Oct. 17, 2022, 8 pp.
U.S. Appl. No. 17/350,663, filed Jun. 17, 2021, by Golden et al.
Office Action from U.S. Appl. No. 16/723,675 dated Feb. 8, 2023, 11 pp.
Tian et al., "Theoretical and experimental determination of the major thermo-mechanical properties of RE2SiO5 (RE=Tb, Dy, Ho, Er, Tm, Yb, Lu, and Y) for environmental and thermal barrier coating applications", Journal of the European Ceramic Society, vol. 36, No. 1, Jan. 2016, pp. 189-202.
Turcer et al., "Towards multifunctional thermal environmental barrier coatings (TEBCs) based on rare-earth byrosilicate solid-solution ceramics", Scripta Materialia, vol. 154, May 2018, 7 pp.
Response to Office Action dated Feb. 8, 2023 from U.S. Appl. No. 16/723,675, filed Jun. 8, 2023, 11 pp.
Response to Final Office Action dated Aug. 8, 2023 from U.S. Appl. No. 16/723,675, filed Nov. 8, 2023, 10 pp.
Advisory Action from U.S. Appl. No. 16/723,675 dated Dec. 8, 2023, 3 pp.

(56) References Cited

OTHER PUBLICATIONS

Final Office Action from U.S. Appl. No. 16/723,675 dated Aug. 8, 2023, 9 pp.
Office Action from U.S. Appl. No. 17/350,663 dated Oct. 5, 2023, 24 pp.
Response to Office Action dated Oct. 5, 2023 from U.S. Appl. No. 17/350,663, filed Jan. 5, 2024, 19 pp.

* cited by examiner

CMAS RESISTANT ENVIRONMENTAL BARRIER COATING SYSTEM

This application claims the benefit of U.S. Provisional Patent Application No. 63/041,596, filed Jun. 19, 2020. The entire content of this application is incorporated herein by reference.

TECHNICAL FIELD

The present disclosure generally relates to, in some examples, environmental barrier coating systems for high-temperature mechanical systems, such as gas turbine engines.

BACKGROUND

The components of gas turbine engines operate in severe environments. For example, the high-pressure turbine airfoils exposed to hot gases in commercial aeronautical engines typically experience surface temperatures of about 1000° C. Components of high-temperature mechanical systems may include a superalloy substrate, a ceramic substrate, or a ceramic matrix composite (CMC) substrate. In many examples, the substrates may be coated with one or more coatings to modify properties of the surface of the substrate. For example, superalloy, ceramic, or CMC substrates may be coated with a thermal barrier coating to reduce heat transfer from the external environment to the substrate, an environmental barrier coating to reduce exposure of the substrate to environmental species, such as oxygen, water vapor, or Calcia-Magnesia-Alumina Silicate (CMAS) containing materials, an abradable coating to improve a seal, or combinations thereof.

SUMMARY

In some examples, the disclosure describes articles, systems, and techniques relating to an environmental barrier coating (EBC) system on a substrate such as a superalloy substrate or other metallic substrate. The EBC system may include an EBC layer and a CMAS resistant layer on the EBC layer (e.g., directly or indirectly). The CMAS resistant layer may form the top layer of the coating system. The CMAS resistant layer may include a rare earth (RE) monosilicate composition including multiple RE metal cations. As will be described below, such a multi-cation RE monosilicate composition may allow for beneficial CMAS resistant properties by reacting with CMAS to form a primary phase as well as a RE apatite phase, e.g., during operation of the article within a high temperature environment. The multi-cation RE monosilicate composition may be tailored such that the RE apatite phase formed from the reaction with CMAS may be stable over the operating temperature range of the article (e.g., from room temperature to about 1500 degrees Celsius). In some examples, in this manner, the CMAS resistant layer may serve as a barrier that reduces infiltration of the CMAS and/or reduces dissolution of the CMAS resistant layer and/or underlying layers. In some examples, the RE metal cations may be selected such that the CMAS resistant layer exhibits other beneficial properties such as a coefficient of thermal expansion (CTE) that is similar to that of the CTE of the underlying EBC layer. The properties of such a CMAS resistant layer may be different than a similar layer including only a single RE cation monosilicate composition.

In one example, the disclosure relates to an article comprising a substrate; an environmental barrier coating (EBC) layer on the substrate; and a CMAS resistant layer on the EBC layer, wherein the CMAS layer includes a rare-earth (RE) monosilicate composition including a plurality of RE metal cations, wherein RE monosilicate composition is configured to react with CMAS to form a reaction product including a RE apatite phase with a $RE_2O_3 \cdot SiO_2$ composition, wherein the RE of the $RE_2O_3 \cdot SiO_2$ composition includes at least one of the plurality of RE metal cations of the RE monosilicate composition.

In another example, the disclosure relates to a method comprising forming an environmental barrier coating (EBC) layer on a substrate; and forming a CMAS resistant layer on the EBC layer, wherein the CMAS layer includes a rare-earth (RE) monosilicate composition including a plurality of RE metal cations, wherein RE monosilicate composition is configured to react with CMAS to form a reaction product including a RE apatite phase with a $RE_2O_3 \cdot SiO_2$ composition, wherein the RE of the $RE_2O_3 \cdot SiO_2$ composition includes at least one of the plurality of RE metal cations of the RE monosilicate.

In another example, the disclosure relates to an article comprising a substrate; an environmental barrier coating (EBC) layer on the substrate; and a CMAS resistant layer on the EBC layer, wherein the CMAS layer includes a rare-earth (RE) monosilicate composition including a plurality of RE metal cations, wherein RE monosilicate composition is configured to react with CMAS to form a reaction product including at least one of: a RE disilicate; a primary apatite phase including a $M_2RE_8(SiO_4)_6O_2$ composition, where M is Ca, Mg, Al, Fe, Ti, Ni, K, Zr, Hf, and/or Na; or a RE apatite phase with a $RE_2O_3 \cdot SiO_2$ composition, wherein the RE of the $RE_2O_3 \cdot SiO_2$ composition includes at least one of the plurality of RE metal cations of the RE monosilicate.

In another example, the disclosure relates to a method comprising forming an environmental barrier coating (EBC) layer on a substrate; and forming a CMAS resistant layer on the EBC layer, wherein the CMAS layer includes a rare-earth (RE) monosilicate composition including a plurality of RE metal cations, wherein RE monosilicate composition is configured to react with CMAS to form a reaction product including at least one of: a RE disilicate; a primary apatite phase including a $M_2RE_8(SiO_4)_6O_2$ composition, where M is Ca, Mg, Al, Fe, Ti, Ni, K, Zr, Hf, and/or Na; or a RE apatite phase with a $RE_2O_3 \cdot SiO_2$ composition, wherein the RE of the $RE_2O_3 \cdot SiO_2$ composition includes at least one of the plurality of RE metal cations of the RE monosilicate.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
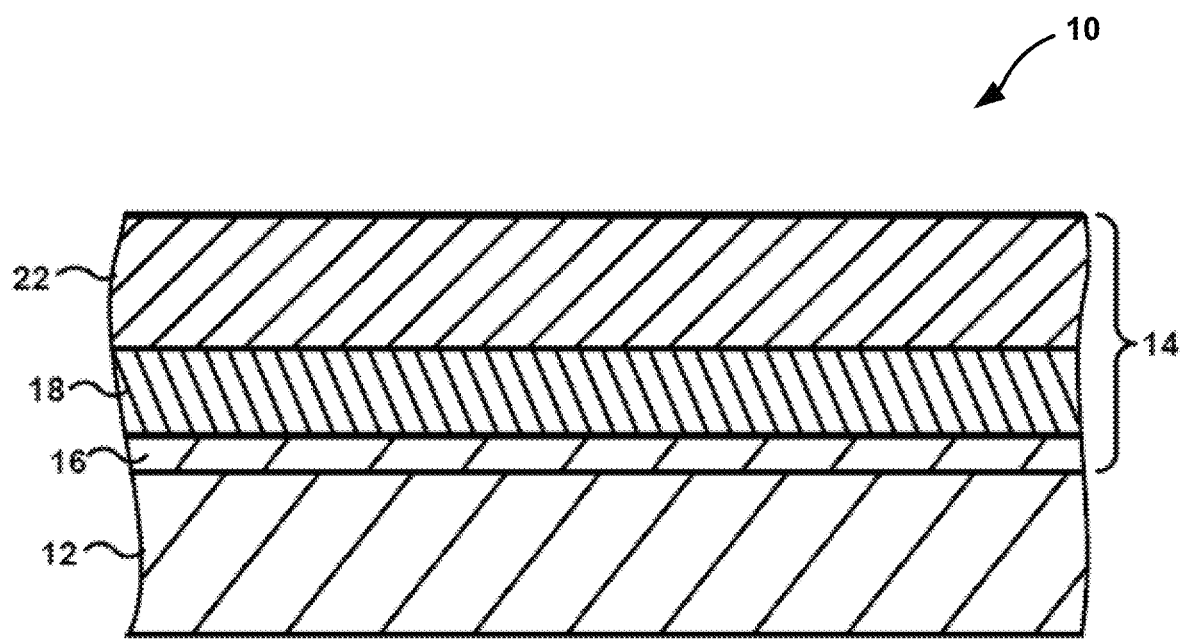
FIG. 1 is a conceptual diagram illustrating an example article including a substrate and an EBC coating system including a CMAS resistant topcoat layer in accordance with the disclosure.

The disclosure describes, in some examples, articles, systems, and techniques relating to EBC coating systems for substrates, such as ceramic or CMC substrates, where the EBC coating systems including at least one EBC layer and a CMAS resistant layer overlying the EBC layer.

In the context of gas turbine engines, increasing demands for greater operating efficiency (e.g., fuel efficiency) has led to the operation of gas turbine engines at higher temperatures. In some examples, substrates, such as ceramic or CMC substrates, of high-temperature mechanical systems are coated with an EBC system to provide environmental protection, in some instances, for the underlying substrate material(s) in a high temperature environment. In some examples, the EBC coating system may be applied to a substrate via air plasma spraying (APS) or other thermal spraying process. The EBC coating system may include a silicon-based bond coat and a ytterbium disilicate (YbDS) plus $Al_2O_3$ EBC layer on the bond coat. Seal segment components may also include an YbDS abradable top coat that has a higher porosity than the underlying EBC layer. During thermal spraying of the EBC layer and/or abradable layer, $SiO_2$ may volatilizes from the YbDS material, which may result in an EBC layer and/or abradable coating with varying amounts of ytterbium monosilicate (YbMS). The presence of YbMS in the EBC layer and/or abradable layer may improve the CMAS resistance of the coating system. However, it may be beneficial to further increase the YbMS content in the coating system.

However, such coatings may be deleteriously attacked from CMAS, e.g., due to the higher operating conditions of the engine and flying in regions with greater concentrations of CMAS on the ground and in the air. For example, increased operating temperatures, may lead to increased damage due to the presence of CMAS deposits within the high temperature environments. The presence of CMAS deposits in the high temperature environments of a gas turbine engine may result from the ingestion of siliceous minerals (e.g., airborne dust, sand, volcanic dust and ashes, fly ash, runway debris, concrete dust, fuel residue, and the like) in the intake gas drawn through the gas turbine engine. For example, when siliceous debris such as sand and dust is ingested into the engine, it can melt and deposit on coated hot section components (e.g. seal segments, vanes and blades). These partial or fully molten deposits are commonly referred to as calcium magnesium aluminosilicates ("CMAS") because the primary oxide constituents are CaO, MgO, $Al_2O_3$ and $SiO_2$. Once molten CMAS has deposited on the surface of EBCs and/or abradable coatings, the CMAS may dissolve, react and/or infiltrate the coating system which leads to coating recession and/or spallation. Therefore, it may be preferable that coating systems including EBC and/or abradable coatings possess sufficient CMAS resistance to meet coating life requirements.

In accordance with examples of the disclosure, EBC systems may include an EBC layer and a CMAS resistant layer on the EBC layer (e.g., as the topcoat of the EBC system) to improve the CMAS resistance of the EBC system. The CMAS resistant layer may include a multi-RE cation monosilicate composition, e.g., where the monosilicate includes multiple different RE metal cations in its crystal lattice. In some examples, the CMAS resistant layer may include the multi-RE metal cation monosilicate content ranging from about 20 volume percent (vol. %) to about 100 vol. % (e.g., with the balance being RE disilicate) and a porosity from about 0.1 vol. % to about 50 vol. %.

The multi-RE cation monosilicate composition that includes multiple different RE metal cations may also be referred to herein as a "mixed RE monosilicate" composition. In some examples, the CMAS resistant layer is comprised of a mixed rare-earth (RE) monosilicate with up to three different RE metal cations $(RE1_xRE2_yRE3_z)_2SiO_5$ where $0.01 \le x, y, z \le 1$ and $x+y+z=1$.

A mixed RE monosilicate composition, e.g., incorporating multiple different cations into the crystal lattice of the monosilicate phase, may provide for increased ability to tailor properties of the CMAS resistant layer (e.g., as compared to a layer containing silicate phase(s) with only a single metal cation). In some examples, the mixed RE monosilicate composition may be configured to react with a CMAS material, e.g., during operation of the coated article in a high temperature environment, to form a primary phase and/or a RE apatite phase, e.g., during operation of the article within a high temperature environment. The different RE metal cations of the mixed RE monosilicate composition may be selected such that the RE apatite phase formed from the reaction with CMAS is be stable over the operating temperature range of the article (e.g., from room temperature to about 1500 degrees Celsius). In some examples, in this manner, the CMAS resistant layer may act as a barrier that reduces infiltration of the CMAS and/or reduces dissolution of the CMAS resistant layer and/or underlying layers.

In some examples, the primary and/or apatite phases resulting from a reaction of the mixed RE monosilicate composition may depend on the composition of the CMAS material reacting with the mixed RE monosilicate composition. For example, when in contact with a $SiO_2$-lean CMAS composition (e.g. Ca:Si ratio (Ca/Si) equal to 0.73), the mixed RE monosilicate layer may be configured to react to form a primary apatite phase with the composition of $M_2RE_8(SiO_4)_6O_2$ where M is Ca, Mg, Al, Fe, Ti, Ni, K, Zr, Hf, and/or Na and a RE apatite phase with the composition of $xRE_2O_3 \cdot ySiO_2$ where the x:y ratio (x/y) is $0.5 < x/y < 1$ (e.g. $2RE_2O_3 \cdot 3SiO_2$). Conversely, when in contact with $SiO_2$-rich CMAS compositions (e.g. Ca:Si ratio (Ca/Si) equal to 0.37) the mixed RE monosilicate may be configured to react to form a RE disilicate phase (primary phase) and/or a RE apatite phase with the composition of $xRE_2O_3 \cdot ySiO_2$ where the x:y ratio (x/y) is $0.5 < x/y < 1$ (e.g. $2RE_2O_3 \cdot 3SiO_2$).

The RE cation in the mixed RE monosilicate coating compositions may be a mixture of, e.g., up to three RE cations with varying molar concentrations of the RE cation (e.g. $(Yb_{0.5},Lu_{0.5})_2SiO_5$, $(Yb_{0.5},Lu_{0.5})_2Si_2O_7$,). In some examples, the reaction products of the reaction between the mixed RE monosilicate of the CMAS resistant layer and the CMAS material may be comprised of a single RE cation (e.g. $Ca_2Yb_8(SiO_4)_6O_2$, $2Yb_2O_3 \cdot 3SiO_2$) or a mixture of up to three RE cations with varying molar concentrations of the RE cation (e.g. $Ca_2(Yb_{0.5},Lu_{0.5})_8(SiO_4)_6O_2$, $2(Yb_{0.5},Lu_{0.5})_2O_3 \cdot 3SiO_2$).

In some examples, the formation of a RE apatite acts as a secondary barrier (with the first barrier being the primary apatite and/or RE disilicate) to slow or reduce the CMAS infiltration and/or dissolution of the CMAS resistant coating and/or underlying coatings such as an underlying EBC layer. In some examples, RE silicates (e.g., RE silicates with only a single metal cation) that are capable of forming a RE apatite may only do so at temperatures greater than the operating conditions of the high temperature combustion engine (e.g., temperatures greater than or equal to 1600 degree Celsius (° C.)). In accordance with examples of the present disclosure, a mixed RE monosilicate composition may include RE metal cations that are selected such that the RE monosilicate composition forms a stable RE apatite phase throughout the entire operating range of the engine (e.g., about room temperature (e.g., about 23° C. to about 1500° C.) to beneficially provide the CMAS resistant properties described herein. A RE monosilicate rich top coat CMAS resistant layer may improve the water vapor resistance of the coating system.

Forming the CMAS resistant layer as the outer layer of the coating system may also allow for desirable coefficient of thermal expansion (CTE) transistion. In some examples, the RE metal cations may be selected to such that the CMAS resistant layer exhibits other beneficial properties such as a CTE that is similar to that of the CTE of the underlying EBC layer. For example, the RE monosilicate composition may include Nd, Gd, or other RE metals as one or more of the multiple RE metal cations in an mol percentage that results in the CMAS resistant layer having a CTE match with the underlying layers. In some examples, the CMAS resistant layer including the mixed RE monosilicate composition may have a higher CTE compared to the underlying substrate, and having one or more layers between the CMAS resistant layer and substrate may allow for improved CTE match to reduce the likelihood of spallation of the coating system. The properties of such a CMAS resistant layer may be different than a similar layer including only a single RE cation monosilicate composition.

FIG. 1 is a conceptual diagram illustrating an example article 10 including a substrate 12 and an EBC system 14. EBC coating system 14 includes an optional bond coat 16, EBC layer 18, and CMAS resistant layer 22. In some examples, article 10 may include a component of a gas turbine engine. For example, article 10 may include a part that forms a portion of a flow path structure, a seal segment, a blade track, an airfoil, a blade, a vane, a combustion chamber liner, or another portion of a gas turbine engine.

Substrate 12 may include a material suitable for use in a high-temperature environment. In some examples, substrate 12 may include a ceramic or a ceramic matrix composite (CMC). Suitable ceramic materials, may include, for example, a silicon-containing ceramic, such as silica ($SiO_2$) and/or silicon carbide (SiC); silicon nitride ($Si_3N_4$); alumina ($Al_2O_3$); an aluminosilicate; a transition metal carbide (e.g., WC, $Mo_2C$, TiC); a silicide (e.g., $MoSi_2$, $NbSi_2$, $TiSi_2$); combinations thereof; or the like. In some examples in which substrate 12 includes a ceramic, the ceramic may be substantially homogeneous.

In examples in which substrate 12 includes a CMC, substrate 12 may include a matrix material and a reinforcement material. The matrix material may include, for example, silicon metal or a ceramic material, such as silicon carbide (SiC), silicon nitride ($Si_3N_4$), an aluminosilicate, silica ($SiO_2$), a transition metal carbide or silicide (e.g., WC, $Mo_2C$, TiC, $MoSi_2$, $NbSi_2$, $TiSi_2$), or another ceramic material. The CMC may further include a continuous or discontinuous reinforcement material. For example, the reinforcement material may include discontinuous whiskers, platelets, fibers, or particulates. Additionally, or alternatively, the reinforcement material may include a continuous monofilament or multifilament two-dimensional or three-dimensional weave, braid, fabric, or the like. In some examples, the reinforcement material may include carbon (C), silicon carbide (SiC), silicon nitride ($Si_3N_4$), an aluminosilicate, silica ($SiO_2$), a transition metal carbide or silicide (e.g. WC, $Mo_2C$, TiC, $MoSi_2$, $NbSi_2$, $TiSi_2$), or the like. In some examples, substrate 12 may take the form of a reaction bonded SiC substrate.

In some examples, substrate 12 may be an oxide-oxide CMC material, such as high strength ceramic alumina fibers in an alumina oxide composite matrix. An oxide-oxide CMC material may include oxide fibers in an oxide matrix (e.g., as compared to a SiC—SiC CMC having a silicon carbide fiber phase in a silicon carbide matrix phase). In some examples, the oxide fibers may be in the form of one or more oxide fiber layers, e.g., fiber plies, which generally extend along an x-y plane. In the case of multiple fiber layers, the fiber layers may be stacked on each other and may include one or more z-directional fibers to attach the stacked layers to each other. The oxide fibers may be continuous or discontinuous fibers having any suitable fiber denier. The oxide fiber layers may be woven or non-woven fabric layers formed of oxide fibers. Example oxide fiber phase may include those principally composed of alumina, including but not limited to, those available under the trade designation Nextel from 3M, Maplewood, MN, such as Nextel 610. Other fiber phase examples include Nextel 312, Nextel 440, and Nextel 720. Example oxide matrix phase may include pure alumina or aluminosilicate variants. Other oxide fibers and oxide matrix materials are contemplated.

Substrate 12 may be manufactured using one or more techniques including, for example, chemical vapor deposition (CVD), chemical vapor infiltration (CVI), polymer impregnation and pyrolysis (PIP), slurry infiltration, melt infiltration (MI), combinations thereof, or other techniques.

EBC system 14 on substrate 12 may help protect underlying substrate 12 from chemical species present in the environment in which article 10 is used, such as, e.g., water vapor, calcia-magnesia-alumina-silicate (CMAS; a contaminant that may be present in intake gases of gas turbine engines), or the like. Additionally, in some examples, EBC system 14 may also protect substrate 12 and provide for other functions besides that of an EBC, e.g., by functioning as a thermal barrier coating (TBC), abradable coating, erosion resistant coating, and/or the like.

EBC system 14 includes EBC layer 18, which may be configured to help protect substrate 12 against deleterious environmental species, such as CMAS and/or water vapor. In some examples, EBC layer 18 may include at least one of a rare-earth oxide, a rare-earth silicate, an aluminosilicate, or an alkaline earth aluminosilicate. For example, EBC layer 18 may include mullite, barium strontium aluminosilicate (B SAS), barium aluminosilicate (BAS), or strontium aluminosilicate (SAS). In some examples, EBC layer 18 may include at least one rare-earth oxide, at least one rare-earth monosilicate ($RE_2SiO_5$, where RE is a rare-earth element), at least one rare-earth disilicate ($RE_2Si_2O_7$, where RE is a rare-earth element), or combinations thereof. The rare-earth element in the at least one rare-earth oxide, the at least one rare-earth monosilicate, or the at least one rare-earth disilicate may include at least one of lutetium (Lu), ytterbium (Yb), thulium (Tm), erbium (Er), holmium (Ho), dysprosium (Dy), gadolinium (Gd), terbium (Tb), europium (Eu), samarium (Sm), promethium (Pm), neodymium (Nd), praseodymium (Pr), cerium (Ce), lanthanum (La), yttrium (Y), or scandium (Sc).

In some examples, EBC layer 18 may include a mixed RE disilicate composition, e.g., including a rare earth (RE) disilicate composition including multiple RE metal cations. The mixed RE disilicate may also have benefits of improved CMAS resistance and the RE metal cations may be selected for beneficial CMAS resistance, a good CTE match and/or lower thermal conductivity. For example, when CMAS resistant layer 22 includes a (Yb, Lu)$_2$SiO$_5$ mixed RE monosilicate composition, EBC layer 18 may be a (Yb,Lu)$_2$Si$_2$O$_7$ mixed RE disilicate layer below to achieve a better match.

In some examples, EBC layer 18 has a thickness of approximately 25 microns to approximately 500 microns, although other thicknesses are contemplated. While EBC layer 18 is shown at a single layer, in other examples, system 14 may include multiple EBC layers having the same or different compositions.

As illustrated in FIG. 1, optional bond coat 16 of coating system 14 is on substrate 12. As used herein, "formed on" and "on" mean a layer or coating that is formed on top of another layer or coating, and encompasses both a first layer or coating formed immediately adjacent a second layer or coating and a first layer or coating formed on top of a second layer or coating with one or more intermediate layers or coatings present between the first and second layers or coatings. In contrast, "formed directly on" and "directly on" denote a layer or coating that is formed immediately adjacent another layer or coating, e.g., there are no intermediate layers or coatings. In some examples, as shown in FIG. 1, bond coat 16 of coating system 14 may be directly on substrate 12. In other examples, one or more coatings or layers of coatings may be between bond coat 16 of coating system 14 and substrate 12.

Bond coat 16 may be between EBC layer 18 and substrate 12 and may increase the adhesion of EBC layer 18 to substrate 12. Bond coat 16 may be in direct contact with substrate 12 and EBC layer 18. In some examples, bond coat 16 has a thickness of approximately 25 microns to approximately 250 microns, although other thicknesses are contemplated.

Bond coat 16 may include any suitable material configured to improve adhesion between substrate 12 and EBC layer 18. In some examples, bond coat 16 may include silicon and take the form of a silicon bond layer. In some examples, bond coat 16 may include silicon, a metal silicide, RE monosilicate, RE disilicate, hafnium silicate, mullite, SiC, a metal oxide, barium strontium aluminosilicate, SiO$_2$ or a mixture thereof. Bond coat 16 may be in direct contact with substrate 12 and EBC layer 18. In some examples, bond coat 16 has a thickness of approximately 25 microns to approximately 250 microns, although other thicknesses are contemplated.

In examples in which substrate 12 includes a ceramic or CMC, bond coat 16 may include a ceramic or another material that is compatible with the material from which substrate 12 is formed. For example, bond coat 16 may include mullite (aluminum silicate, Al$_6$Si$_2$O$_{13}$), silicon metal or alloy, silica, a silicide, or the like. Bond coat 16 may further include other elements, such as a rare earth oxide or rare earth silicate including an oxide or silicate of lutetium (Lu), ytterbium (Yb), thulium (Tm), erbium (Er), holmium (Ho), dysprosium (Dy), gadolinium (Gd), terbium (Tb), europium (Eu), samarium (Sm), promethium (Pm), neodymium (Nd), praseodymium (Pr), cerium (Ce), lanthanum (La), yttrium (Y), and/or scandium (Sc).

The composition of bond coat 16 may be selected based on the chemical composition and/or phase constitution of substrate 12 and the overlying layer (e.g., EBC layer 18). For example, if substrate 12 includes a ceramic or a CMC, bond coat 16 may include silicon metal or alloy or a ceramic, such as, for example, mullite.

In some cases, bond coat 16 may include multiple layers. For example, in some examples in which substrate 12 includes a CMC including silicon carbide, bond coat 16 may include a layer of silicon on substrate 12 and a layer of mullite, a rare earth silicate, or a mullite/rare earth silicate dual layer on the layer of silicon. In some examples, bond coat 16 including multiple layers may provide multiple functions of bond coat 16, such as, for example, adhesion of substrate 12 to an overlying layer (e.g., EBC layer 18), chemical compatibility of bond coat 16 with each of substrate 12 and the overlying layer, a better coefficient of thermal expansion match of adjacent layers, or the like.

Bond coat 16 may be applied on substrate 12 using, for example, thermal spraying, e.g., air plasma spraying, high velocity oxy-fuel (HVOF) spraying, low vapor plasma spraying, suspension plasma spraying; physical vapor deposition (PVD), e.g., electron beam physical vapor deposition (EB-PVD), directed vapor deposition (DVD), cathodic arc deposition; chemical vapor deposition (CVD); slurry process deposition; sol-gel process deposition; electrophoretic deposition; or the like.

EBC system 14 includes CMAS resistant layer 22 as a topcoat, which may be configured to help protect substrate 12, EBC layer 18, and/or bond coat 16 against deleterious environmental species, such as CMAS and/or water vapor. As described herein, CMAS resistant layer 22 may include a mixed RE monosilicate composition with more than one RE metal cation, e.g., two, up to three, or more than three RE metal cations. For example, the CMAS resistant layer 22 may include a RE monosilicate composition that includes a plurality of different RE metal cations incorporated into the crystal lattice structure of the monosilicate phase. In some examples, the CMAS resistant layer is comprised of a mixed rare-earth (RE) monosilicate with up to three different RE metal cations (RE1$_x$RE2$_y$RE3$_z$)$_2$SiO$_5$ where 0.01≤x, y, z≤1 and x+y+z=1. In some examples, the CMAS resistant layer is comprised of a mixed rare-earth (RE) monosilicate with two different RE metal cations (RE1$_x$RE2$_y$)$_2$SiO$_5$ where 0.01≤x, y≤1 and x+y=1. Rare earth metals include lutetium (Lu), ytterbium (Yb), thulium (Tm), erbium (Er), holmium (Ho), dysprosium (Dy), gadolinium (Gd), terbium (Tb), europium (Eu), samarium (Sm), promethium (Pm), neodymium (Nd), praseodymium (Pr), cerium (Ce), lanthanum (La), yttrium (Y), and scandium (Sc).

The mixed RE monosilicate composition of CMAS resistant layer 22 may provide for increased ability to tailor properties of the CMAS resistant layer (e.g., as compared to a layer containing silicate phase(s) with only a single metal cation). Tailoring of such properties may be achieved, e.g., by achieved by selecting the RE metal cations for the mixed RE monosilicate compositions described herein. One such example property is CMAS resistance. As noted above, under certain turbine operating conditions siliceous materials such as airborne dust, sand, fly ash and volcanic dust are ingested into the engine and accumulate on the hot surfaces of engine components (blade, vanes, combustion tiles and turbine segments) and melt when temperatures reach about 1200° C., depending on the composition of the deposit. Calcium Magnesium Alumino-Silicate (or CMAS) is the general name given to these molten deposits, as the predominant oxides are Calcia (CaO), Magnesia (MgO), Alumina (Al$_2$O$_3$) and Silica (SiO$_2$). In some examples, the composition of substrate 12, bond coat 16, and/or EBC layer 18 may be susceptible to CMAS attack, e.g., where molten CMAS may dissolve the respective layers and/or substrate. Without CMAS resistant layer 22, this process may ultimately lead to, e.g., spallation and/or partial or complete dissolution of coating system 14 such as EBC layer 18.

In order to provide CMAS resistance, the mixed RE monosilicate composition of CMAS resistant layer 22 may be configured to react with a CMAS material, e.g., during operation of the coated article in a high temperature environment, to form a primary phase as well as a RE apatite phase, e.g., during operation of the article within a high temperature environment. The different RE metal cations of the mixed RE monosilicate composition may be selected such that the RE apatite phase formed from the reaction with CMAS is be stable over the operating temperature range of the article (e.g., from room temperature (e.g., about 23 degree Celsius) to about 1500 degrees Celsius). In some examples, in this manner, the CMAS resistant layer may as a barrier that reduces infiltration of the CMAS and/or reduces dissolution of the CMAS resistant layer and/or underlying layers.

In some examples, the primary and/or apatite phases resulting from a reaction of the mixed RE monosilicate composition of CMAS resistant layer 22 may depend on the composition of the CMAS material reacting with the mixed RE monosilicate composition. For example, when in contact with a $SiO_2$-lean CMAS composition (e.g. Ca:Si ratio (Ca/Si) equal to 0.73), the mixed RE monosilicate of CMAS resistant layer 22 may be configured to react to form a primary apatite phase with the composition of $M_2RE_8(SiO_4)_6 O_2$ where M is Ca, Mg, Al, Fe, Ti, Ni, K, Zr, Hf, and/or Na and a RE apatite phase with the composition of $xRE_2O_3 \cdot ySiO_2$ where the x:y ratio (x/y) is 0.5<x/y<1 (e.g. $2RE_2O_3 \cdot 3SiO_2$). Conversely, when in contact with $SiO_2$-rich CMAS compositions (e.g. Ca:Si ratio (Ca/Si) equal to 0.37) the mixed RE monosilicate of CMAS resistant layer 22 may react to form a RE disilicate phase (primary phase) and/or a RE apatite phase with the composition of $xRE_2O_3 \cdot ySiO_2$ where the x:y ratio (x/y) is 0.5<x/y<1 (e.g. $2RE_2O_3 \cdot 3SiO_2$).

In some examples, the reaction products of the reaction between the mixed RE monosilicate of the CMAS resistant layer and the CMAS material may be comprised of a single RE cation (e.g. $Ca_2Yb_8(SiO_4)_6O_2$, $2Yb_2O_3 \cdot 3SiO_2$) or a mixture of up to three RE cations with varying molar concentrations of the RE cation (e.g. $Ca_2(Yb_{0.5},Lu_{0.5})_8(SiO_4)_6O_2$, $2(Yb_{0.5},Lu_{0.5})_2O_3 \cdot 3SiO_2$).

In some examples, the formation of a RE apatite acts as a secondary barrier (with the first barrier being the primary apatite and/or RE disilicate) to slow or reduce the CMAS infiltration and/or dissolution of the CMAS resistant coating and/or underlying coatings such as an underlying EBC layer. In some examples, RE silicates (e.g., RE silicates with only a single metal cation) that are capable of forming a RE apatite may only do so at temperatures greater than the operating conditions of the high temperature combustion engine (e.g., temperatures greater than or equal to 1600 degree Celsius (° C.)). In accordance with examples of the present disclosure, a mixed RE monosilicate composition may include RE metal cations that are selected such that the RE monosilicate composition forms a stable RE apatite phase at room temperature (about 23° C.) and/or throughout the entire operating range of the engine (e.g., room temperature above, about 23° C. to about 2000° C. or about 23° C. to about 1500° C.) to beneficially provide the CMAS resistant properties described herein. The RE apatite phase may be stable at the described temperature from about 1 to about 60 atmospheres. The other phases described herein resulting from the reaction of the mixed RE monosilicate composition (e.g., primary apatite phase and RE disilicate) may be stable at the same temperatures and temperature ranges.

In some examples, the RE metal cations may be selected to such that the CMAS resistant layer 22 exhibits other beneficial properties such as a coefficient of thermal expansion (CTE) that is similar to that of the CTE of the underlying EBC layer 18, e.g., so that CMAS resistant layer 22 exhibits desirable adhesion to EBC layer 18. In some examples, the RE monosilicate composition of CMAS resistant layer 22 may include one or more of the multiple RE metal cations in an mol. % that results in the CMAS resistant layer having a desired CTE. In some examples, EBC layer 18 may have a coefficient of thermal expansion of approximately 4 to approximately 7. In some examples, the CTE of CMAS resistant layer 22 may be about 6.5 to about 9.5. In some examples, the difference in coefficient of thermal expansion between EBC layer 18 and CMAS resistant layer from about 1 and about 3 ppm/K. In some examples, the CTE of CMAS resistant layer 22 may be within about 35% of EBC layer 18 and/or underlying substrate 12.

An example that demonstrates the benefit of multiple RE cations is shown in FIG. 6A-6C, where the CMAS resistance of a $(Gd_{0.5}La_{0.5})_2SiO_5$ (FIG. 6C) was determined to be greater than its respective pure RE monosilicates. In some examples, the CTE of CMAS resistant layer 22 is preferably within ±2.5 ppm/K of EBC layer 18. Mixed RE monosilicates comprised of multiple RE cations may have a lower thermal conductivity than their respective pure monosilicates (e.g., <2 W/m·K). Additional benefits of RE monosilicates may include their stability in high temperature water vapor and chemical compatibility with the composition of EBC layer 18 and/or other underlying layers of coating system 14.

In some examples, the thermal conductivity of CMAS resistant layer 22 may be modified, e.g., decreased or increased, as compared to a similar layer including a RE monosilicate composition but with only one metal cation in the monosilicate. In some examples, it may be preferred that CMAS resistant layer 22 exhibits a relatively low thermal conductivity, e.g., to provide thermal protection to substrate 12 and/or the other layers underlying CMAS resistant layer 22 during operation of article 10 in a high temperature environment. In this manner, CMAS resistant layer 22 may function as an thermal barrier layer to provide thermal protection to the underlying layer(s) and substrate 12. The incorporation of multiple RE metal cations into the monosilicate composition of CMAS resistant layer 22 may allow for the thermal conductivity of CMAS resistant layer 22 to be tailored or otherwise modified such that CMAS resistant layer 22 exhibits a desired level of thermal conductivity. In some examples, CMAS resistant layer 22 may have a thermal conductivity of less than approximately 2.5 W/m K, or a thermal conductivity of approximately 0.5 W/m K to approximately 2 W/m K.

CMAS resistant layer 22 may comprise, consist or consist essentially of the mixed RE monosilicate composition described herein. In some examples, CMAS resistant layer 22 may include at least about 20 vol. %, such as about 20 vol. % to about 100 vol. % of the mixed RE monosilicate compositions described herein, e.g. with the balance being a RE disilicate. CMAS resistant layer 22 may have a porosity or other void volume from about 0.1 vol. % to about 50 vol. %. If a thermal spray process is used to form the mixed RE monosilicate, there may be some $SiO_2$ loss from spraying, so a mixed RE monosilicate may be present with other possible $SiO_2$-lean mixed RE silicate and/or mixed RE oxide. The coating may react with CMAS to form the phases mentioned described herein; primary apatite, RE apatite, RE disilicate, depending on the CMAS composition. Other minor phases such as garnet, diopside, albite, anthorite, melilite, cuspidine and/or wollastonite may form depending on the CMAS composition.

In some examples, CMAS resistant layer 22 may include one or more dopants, such as, $Al_2O_3$, $Fe_2O_3$, $Fe_3O_4$, $RE_2O_3$, $Ta_2O_5$, $HfO_2$, $ZrO_2$, CaO, MgO, SrO, $LiREO_2$ and/or $RE_3Al_5O_{12}$ (e.g. YbAG or YAG). The dopants may be added to the mixed RE monosilicate composition, e.g., up to about 15 mol. % or greater in some examples. These dopants may act as sintering aids that densify CMAS resistant layer 22 (e.g., to provide reduced porosity) which results in an increase in coating hermeticity (e.g., to slow oxidant transport through the coating system 14).

In some examples, CMAS resistant layer 22 may include only a single monosilicate phase, where to the single monosilicate phase includes two or more RE metal cations in the crystal lattice structure of the single monosilicate phase. The number of RE metal cations in the crystal lattice structure may be two or more than two, such as three, or more than three RE metal cations. As another example, CMAS resistant layer 22 may include multiple monosilicate phases, where each monosilicate phase includes multiple RE cations incorporated into the crystal lattice structure of the monosilicate phase. Each of the multiple monosilicate phases may include the same RE metal cations in the crystal lattice structure, different RE metal cations in the crystal lattice structure, or some combination of the same and different RE metal cations in the crystal lattice structure. For example, in a system including a first monosilicate phase and a second monosilicate phase. The first silicate phase may incorporate RE metal cations "X" and "Y" and the second silicate phase may include RE metal cations "X" and "Y," may include RE metal cations "X" and "Z" or may include RE metal cations "Z" and "A". In the described example, metal cations X, Y, Z, and A do not refer to specific RE metal cations but only denote different RE metal cations.

The different RE metal cations may be present in each monosilicate phase in any suitable ratio. In some examples, for a monosilicate phase including only a first RE metal cation and a second RE metal cation incorporated into the crystal lattice structure, the first and second metal cations may be present in approximately a 1:1 molar ratio. In other examples, the monosilicate phase may include more of the first RE metal cation than the second RE metal cation or vice versa. In a monosilicate phase including first, second, and third metal RE cations, the first, second, and third RE cations may be present in approximately equal or equal amounts, different amounts, or first and second cations in approximately equal or equal amounts with the third cation being present in a greater or lesser amount that the first and second cation.

CMAS resistant layer 22 may be incorporated into a coating system such as EBC coating system 14 in any suitable manner, e.g., to protect the coating system and underlying substrate from damage due to CMAS being present in the operational environment. In the example of FIG. 1, CMAS resistant layer 22 is the top layer ("top coat") of coating system 14 and it forms the outer surface of coating system 14. In other examples, an optional RE apatite coating layer may be applied on top of CMAS resistant layer 22, e.g., to form the top layer of coating system 14. In such an example, the optional RE apatite coating layer may include a RE apatite composition of $xRE_2O_3 \cdot ySiO_2$ where the x:y ratio (x/y) is 0.5<x/y<1 (e.g. $2RE_2O_3 \cdot 3SiO_2$). RE may be single or multiple RE cations.

Figure 2:
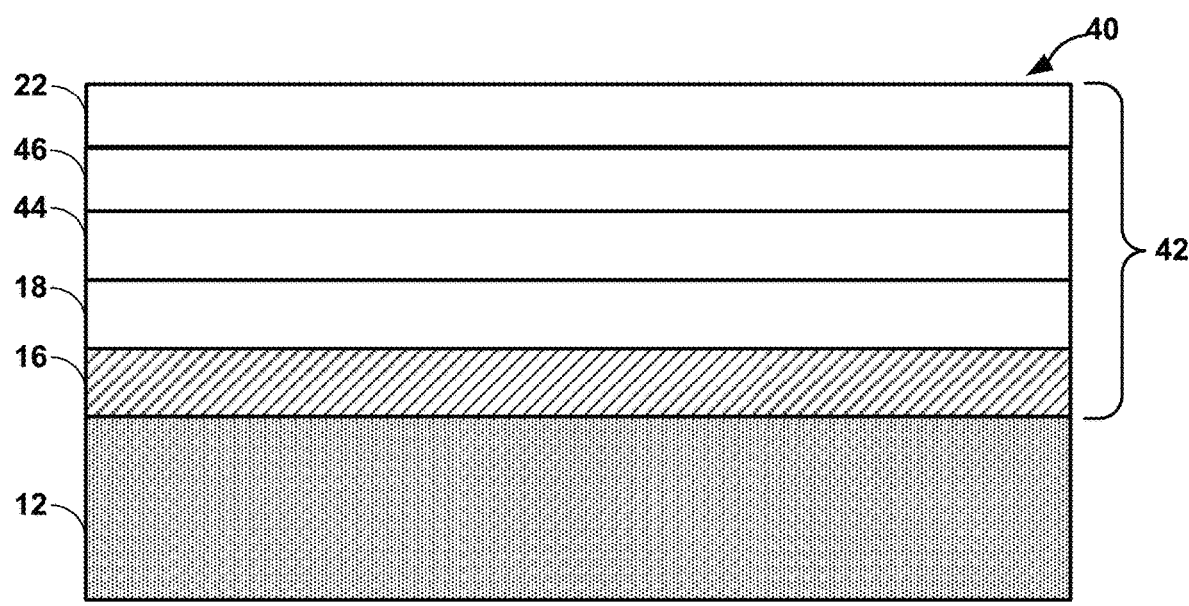
FIGS. 2-4 are conceptual diagrams illustrating various other example articles including a substrate and an EBC coating system including a CMAS resistant layer in accordance with the disclosure.
Figure 3:
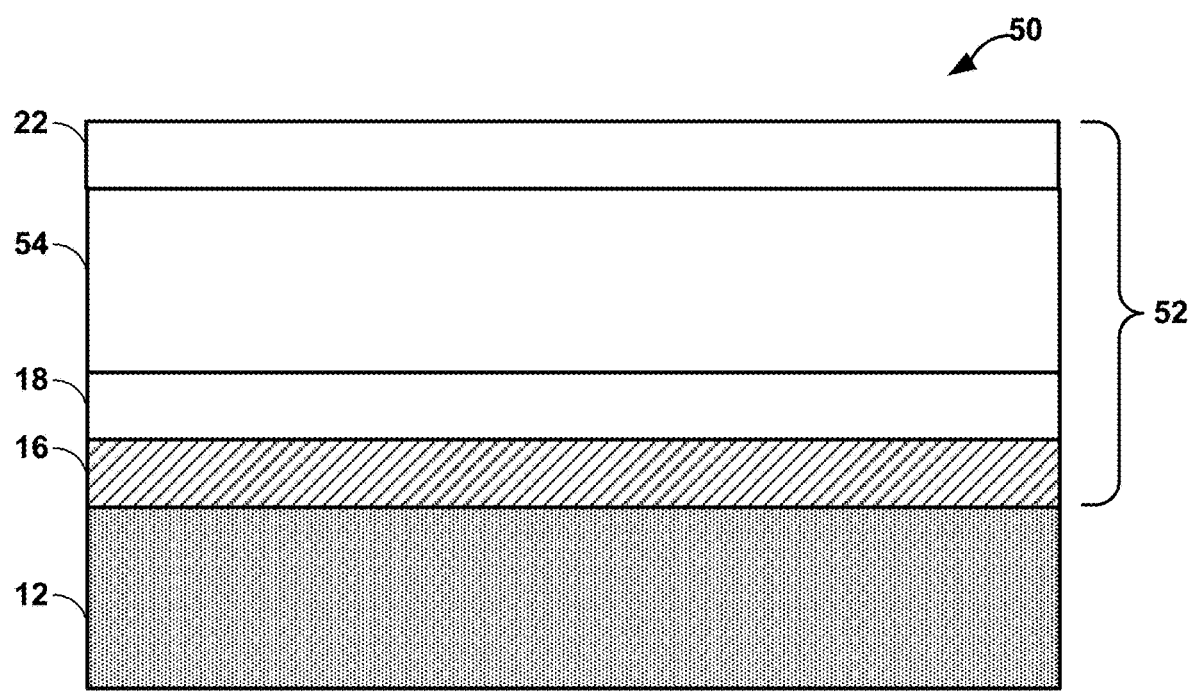
Figure 4:
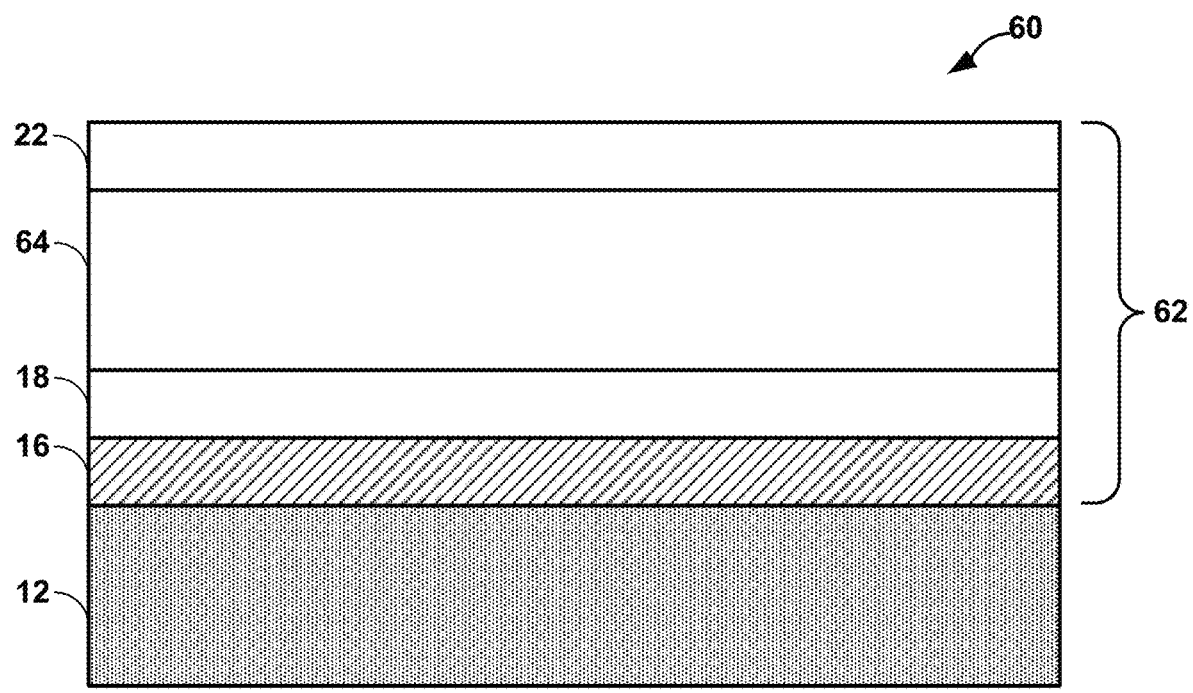

Example coating system architectures are shown in FIGS. 1-4 where the mixed RE monosilicate CMAS resistant layer 22 may form the top coat in a coating system including one or more underlying EBC layers and/or an abradable coating. As described below, the mixed RE monosilicate CMAS resistant layer 22 may be applied to EBC layer 18 via a thermal spraying process (e.g., APS, suspension plasma spraying (SPS), HVOF, low pressure plasma spraying (LPPS), plasma spray-physical vapor deposition (PS-PVD), or the like.), CVD, DVD, EB-PVD, electrophoretic deposition (EPD), slurry or sol-gel process. FIG. 2 shows an example article 40 in which a RE monosilicate rich topcoat CMAS resistant layer 22 may be applied onto EBC layers 18, 44 and abradable layer 46 that are comprised of a stoichiometric RE disilicate or a $SiO_2$-lean RE disilicate (disilicate+monosilicate mixture). For example, abradable coating 46 may be applied on top of EBC layer 18 and/or EBC layer 44 for components for which such a layer configuration is desired. Components that do not require an abradable coating may contain an optional second EBC layer 44 in addition to first EBC layer 18. FIG. 3 shows an example article 50 where RE monosilicate rich topcoat CMAS resistant layer 22 is applied onto a functionally graded EBC/abradable layer 54 with varying RE monosilicate and/or porosity along the thickness of the layer 54. As shown in FIG. 3, coating system 52 includes optional EBC layer 18 below functionally graded EBC/abradable layer 54. In some examples, the chemistry of the functionally graded layer 54 is a RE disilicate with increasing amounts of RE monosilicate moving away from optional EBC layer 18. The monosilicate content at the upper surface of the functionally graded layer 54 may be closely matched to the monosilicate content in the RE monosilicate rich topcoat 22 (e.g., within 40 vol. % difference such as within 15 vol. %. FIG. 4 shows an example coating system 62 including a RE monosilicate rich topcoat CMAS resistant layer 22 applied onto an alternating layered EBC 64 (e.g., with each individual layer having a unique chemistry) and optional EBC layer 18 below alternating layered EBC 64. In each of FIGS. 1-4, the example coating system architectures may include optional bond coat 16 that is applied onto substrate 12. In some examples, bond coat 16 may comprise silicon, mullite, a metal silicide, $HfSiO_4$ and mixtures thereof.

FIG. 2 is a conceptual diagram illustrating another example article 40 including a substrate 12 and an EBC coating system 42. EBC coating system 42 and substrate 12 may be the same or substantially similar to that of EBC coating system 14 and substrate 12 of FIG. 1, and the layers of coating system 42 are numbered similar to those of coating system 14.

However, unlike that of article 10 shown in FIG. 1, coating system 42 includes optional second EBC layer 44 and optional abradable layer 46 below CMAS resistant layer 22 and on first EBC layer 18. In such a configuration, coating system 42 may be configured such that abradable layer 46 has a greater porosity than first EBC layer 18 and second EBC layer 44, and the porosity of abradable layer 46 may be provided such that the outer surface of abradable layer 46 is abraded, e.g., when brought into contact with an opposing surface such as a blade tip. In some examples, abradable layer 46 may have a porosity or other void volume of about 8 vol. % to about 50 vol. %, where porosity is measured as a percentage of pore volume divided by total volume of abradable layer 46. In each case, the porosity of layers 22 and 46 may be measured using mercury porosimetry, optical microscopy or Archimedean method. In some examples, abradable layer 46 may define a thickness between about 0.005 inches (about 127 micrometers) and about 0.100 inches (about 2540 micrometers). In other examples, abradable layer 46 may have a different thickness.

The composition of abradable layer 46, first EBC layer 18, and second EBC layer 44 may be the same or similar to that described for EBC layer 18 above. In some examples, abradable layer 46, first EBC layer 18, and/or second EBC layer 44 may include a stoichiometric RE disilicate or a $SiO_2$-lean RE disilicate (disilicate+monosilicate mixture). First EBC 18 and second EBC 44 may have differences in composition, porosity and/or microstructure. For examples, the difference may be in monosilicate content/chemistry modifications, different levels of porosity and/or different microstructure (e.g., dense layer, dense vertically cracked, columnar, etc.). In some examples, first EBC layer 18 and/or second EBC layer 44 may include a mixed RE disilicate composition, e.g., including a rare earth (RE) disilicate composition including multiple RE metal cations. The mixed RE disilicate may also have benefits of improved CMAS resistance and the RE metal cations may be selected for beneficial CMAS resistance, a good CTE match and/or lower thermal conductivity. For example, when CMAS resistant layer 22 includes a $(Yb, Lu)_2SiO_5$ mixed RE monosilicate composition, EBC layer 18 and/or 44 may be a $(Yb,Lu)_2Si_2O_7$ mixed RE disilicate layer below to achieve a better match.

With CMAS resistant layer 22 overlying abradable layer 46, CMAS resistant layer 22 may have a porosity or other void volume that is the same or substantially similar to that of abradable layer 46, e.g., to allow CMAS resistant layer 22 to also be abraded in a manner similar to that of abradable layer 46. In some examples, abradable layer 46 may include a porosity of, e.g., about 8 volume percent (vol. %) to about 50 vol. %, where porosity is measured as a percentage of pore volume divided by total volume of abradable layer 46. In each case, the porosity of layers 46 and 22 may be measured using mercury porosimetry, optical microscopy or Archimedean method.

In some examples, the porosity of CMAS resistant layer 22 and abradable layer 46 may be created and/or controlled by plasma spraying the coating material using a co-spray process technique in which the coating material and a coating material additive are fed into a plasma stream with two radial powder feed injection ports. The feed pressures and flow rates of the coating material and coating material additive may be adjusted to inject the material on the outer edge of the plasma plume using direct 90-degree angle injection. This may permit the coating material particles to soften but not completely melt, and the coating material additive to not burn off, but rather soften sufficiently for adherence within coating 16.

In other examples, the porosity of CMAS resistant layer 22 and abradable layer 46 may be controlled by the use of coating material additives and/or processing techniques to create the desired porosity. For example, to form abradable layer 46 of coating system 42 in FIG. 2, a fugitive material that melts or burns at the use temperatures of the component (e.g., a blade track) may be incorporated into the coating material that forms abradable layer 46. The fugitive material may include, for example, graphite, hexagonal boron nitride, or a polymer such as a polyester, and may be incorporated into the coating material prior to deposition of the coating material on substrate 12 to form abradable layer 46. The fugitive material then may be melted or burned off in a post-formation heat treatment, or during operation of the gas turbine engine, to form pores in coating system 42.

In some examples in which CMAS resistant layer 22 and/or abradable layer 46 has a columnar microstructure, CMAS resistant layer 22 and/or abradable layer 46 may be deposited on substrate 12 using a SPS technique, an EB-PVD technique, a plasma spray physical vapor deposition (PSPVD) technique, or a directed vapor deposition (DVD) technique. In some examples, layers 22 and 46 including a columnar microstructure may include a dense vertically cracked (DVC) coating, which in some cases, may be deposited on substrate 12 using an air plasma spray technique.

FIG. 3 is a conceptual diagram illustrating another example article 50 including a substrate 12 and an EBC coating system 52. EBC coating system 52 and substrate 12 may be the same or substantially similar to that of EBC coating system 14 and substrate 12 of FIG. 1, and the layers of coating system 52 are numbered similar to those of coating system 14.

However, unlike that of article 10 shown in FIG. 1, coating system 52 includes graded EBC/abradable layer 54 on EBC layer 18. Graded EBC/abradable layer 54 may include varying RE monosilicate amounts (e.g., as mixed with RE disilicate) and/or porosity along the thickness of the layer 54, e.g., rather than being substantially uniform in composition and/or porosity along the thickness. For example, the porosity of graded EBC/abradable layer 54 may be graded such that the porosity decreases moving from top surface of graded EBC/abradable layer 54 to top surface of EBC layer 18. In some examples, graded EBC/abradable layer 54 may exhibit a relatively high porosity near top surface like that described for abradable layer 46 of coating system 42 (FIG. 2) and a lower porosity adjacent to top surface of EBC layer 18 (e.g., about 0.1 to about 8 vol. %). In this manner, the upper portion of graded EBC/abradable layer 54 may still function as an abradable layer and the lower portion of EBC/abradable layer 54 may provide better environmental protection for coating system 52 and/or substrate 12.

Additionally, or alternatively, graded EBC/abradable layer 54 may be compositionally graded, e.g., with varying amounts of RE monosilicate and RE disilicate content along the thickness of layer 54. For example, relatively low amounts of RE monosilicate content and relatively high amounts of RE disilicate may be present at the interface between graded EBC/abradable layer 54 and EBC layer 18. The RE monosilicate content in layer 54 may increase from that interface to the top surface of graded EBC/abradable layer 54 while the RE disilicate content may decrease. The grading may be selected so there is a good CTE match at the interface between graded EBC/abradable layer 54 and EBC layer 18, and/or increase the monosilicate going towards the surface of graded EBC/abradable layer 54 for better water vapor and CMAS resistance.

The gradient in graded EBC/abradable layer 54 may be a substantially continuous gradient or it may be accomplished by depositing multiple layer with different compositions and/or porosity. For example, graded EBC/abradable layer 54 may be formed by depositing two sub-layers, with each sub-layer having a different porosity and/or a different composition to accomplish the compositional grading and porosity grading described herein.

FIG. 4 is a conceptual diagram illustrating another example article 60 including a substrate 12 and an EBC coating system 62. EBC coating system 62 and substrate 12 may be the same or substantially similar to that of EBC coating system 14 and substrate 12 of FIG. 1, and the layers of coating system 62 are numbered similar to those of coating system 14.

However, unlike that of article 10 shown in FIG. 1, coating system 62 includes alternating layered EBC 64 on optional EBC layer 18 with CMAS resistant layer 22 as the topcoat. Alternating layered EBC 64 may include a plurality of individual EBC sub-layers (e.g., two or more) (not shown) that each have a unique chemistry or composition. For example, alternating layered EBC 64 may include individual sub-layer alternating between RE monosilicate rich layer (e.g., predominantly RE monosilicate composition with the balance being RE disilicate) and RE disilicate rich layers (e.g., predominantly RE disilicate composition with the balance being RE monosilicate).

Figure 5:
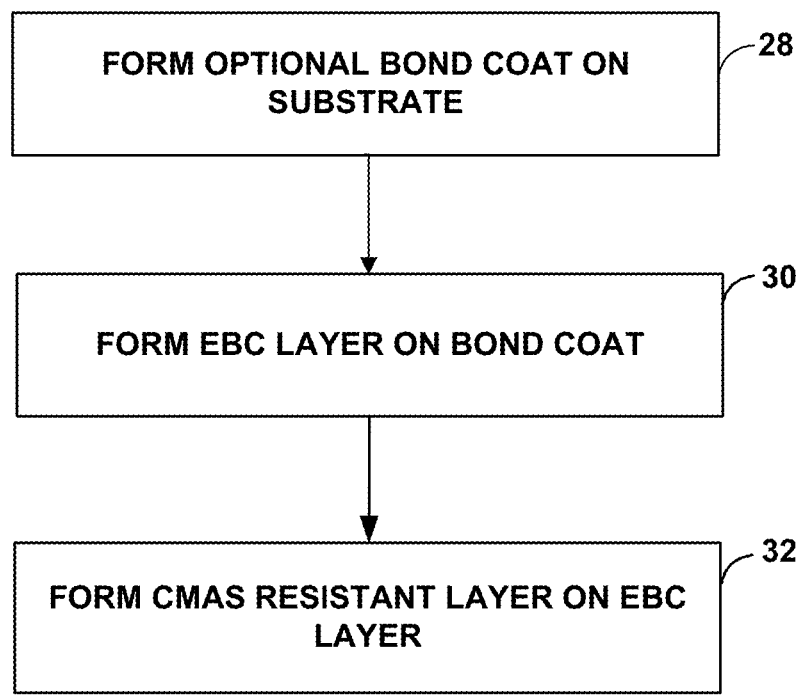
FIG. 5 is a flow diagram illustrating an example technique of forming an article including an EBC coating system in accordance with the disclosure.

FIG. 5 is a flow diagram illustrating an example technique of forming an article including a substrate and an EBC coating system including at least one CMAS resistant layer on an EBC layer. The technique of FIG. 5 will be described with respect to article 10 of FIG. 1 for ease of description. However, in other examples, the technique of FIG. 5 may be used to form articles other than article 10 of FIG. 1, such as articles 40, 50, and 60 described herein.

The example technique of FIG. 5 optionally includes forming bond coat 16 on substrate 12 of article 10 (28). Forming bond coat 16 may include, for example, thermal spraying, e.g., air plasma spraying, high velocity oxy-fuel (HVOF) spraying, low vapor plasma spraying, suspension plasma spraying; physical vapor deposition (PVD), e.g., electron beam physical vapor deposition (EB-PVD), directed vapor deposition (DVD), cathodic arc deposition; chemical vapor deposition (CVD); slurry process deposition; sol-gel process deposition; electrophoretic deposition; or the like. Bond coat 16 may have a composition such as those described above. Bond coat 16 may promote bonding or retention of subsequently deposited or applied layers, for example, EBC layer 18 and CMAS resistant layer 22, on substrate 12.

The example technique of FIG. 5 includes forming EBC layer 18 on bond coat 16 (30). EBC layer 18 may be have a composition such as that described herein and may be deposited using any suitable technique, such as, e.g., via a thermal spraying process (e.g., APS, suspension plasma spraying (SPS), HVOF, low pressure plasma spraying (LPPS), plasma spray-physical vapor deposition (PS-PVD), or the like.), CVD, DVD, EB-PVD, electrophoretic deposition (EPD), slurry or sol-gel process.

Following the formation of EBC layer 18, CMAS resistant layer 22 may be formed on EBC layer 18 (32). CMAS resistant layer 22 may be formed using any of the suitable techniques described herein, such as via thermal spraying process (e.g., APS, suspension plasma spraying (SPS), HVOF, low pressure plasma spraying (LPPS), plasma spray-physical vapor deposition (PS-PVD), or the like.), CVD, DVD, EB-PVD, electrophoretic deposition (EPD), slurry or sol-gel process. The CMAS resistant layer 22 may include a mixed RE monosilicate composition consistent with the examples described herein.

In some examples, the technique of FIG. 5 may include mixing selected RE monosilicate powders with each other as part of the formation of mixed RE monosilicate CMAS resistant layer 22. The selected RE monosilicate powders may be monosilicate powders, where each monosilicate powder is a silicate with a single cation of the desired final product for mixed RE monosilicate composition of CMAS resistant layer 22, e.g., with more than one RE cation incorporated into the crystal lattice of the mixed RE monosilicate composition. For example, the monosilicate powders that are mixed with each other may include a single RE earth metal cation. In one example, the silicate powders may all be rare earth monosilicates such as $Gd_2SiO_5$, $Nd_2SiO_5$, and $La_2SiO_5$ powders as described below. For example, starting with powders of single rare earth cation, those starting powders may be mixed to form one or more RE monosilicate phases with any ratio and number of multiple RE cations.

The amount of each RE monosilicate powder in the starting components may be present in any suitable amount to provide for a desired monosilicate phase composition of CMAS resistant layer 22 such as the composition of layer 22 described above. In some examples, each of the monosilicate powders mixed with each may be present in an approximately 1:1 molar ratio (e.g., a substantially equimolar ratio of the monosilicate powders) or may be in a non-equimolar ratio. In some examples, the Gd and/Nb monosilicate(s) may be present in at least 30 mol. % of the entire mixture, as described above.

The mixing of the monosilicate powder may be carried out using any suitable technique. In some examples, the mixing process may include high energy ball milling or other mechanical mixing technique. As another example, liquid precursor processing, such as liquid precursor processing used for individual RE monosilicates, may be used. For example, liquid precursors like nitrates may be used as starting materials and mixed in the liquid state, then dried/heat treated to form mixed powders. In the case of a precursor for a plasma spray process, the individual powder could be mixed together using spray drying methods.

The mixed RE monosilicate powders may then be applied directly on EBC layer 18 to form CMAS resistant layer 22 (32). CMAS resistant layer 22 may be applied on EBC layer 18 using any one or more of a wide variety of coating techniques, including, for example, via a thermal spraying process (e.g., APS, suspension plasma spraying (SPS), HVOF, low pressure plasma spraying (LPPS), plasma spray-physical vapor deposition (PS-PVD), or the like.), CVD, DVD, EB-PVD, electrophoretic deposition (EPD), slurry or sol-gel process. In some examples, the mixture of powders may be deposited on EBC layer 18 to form a layer and then quenched to form a single RE monosilicate phase with multiple RE metal cations or a plurality of mono silicate phases each with multiple RE cations, where the number of RE monosilicate phases is less than the number of starting RE monosilicate powder phases.

Prior to mixing, the respective silicate powers may each define a distinct RE monosilicate phase, with each silicate only including a single RE cation. After mixing and application onto EBC layer 18 to form CMAS resistant layer 22, the powders may form a single RE monosilicate phase including more than one RE cation (e.g., the single monosilicate phase may include the RE cation of each of the distinct monosilicate powder phases) or multiple monosilicate phases each including multiple RE cations (e.g., each of the monosilicate phases may include the RE cation of each of the distinct RE monosilicate powder phases or at least multiple RE cations from the distinct monosilicate powder phases). In the case of the multiple monosilicate phases, the number of monosilicate phases of CMAS resistant layer 22 may be less than the number of distinct powder phases in the original mixture. For example, if three monosilicate powders are mixed and applied to EBC layer 18, CMAS resistant layer 22 may include less three monosilicate phases, with each phase including three different RE cations from the three different monosilicate powders.

While the example technique of FIG. 2 may include a separate step for mixing the monosilicate powders prior to application of the mixture on EBC layer 18, in other examples, the application process may include thermal spraying or other techniques in which the powders are additionally or alternatively mixed upon contact with EBC layer 18. In some thermal spraying techniques, the powders may be initially mixed with each other before thermal spraying and then further mixed with each other upon contact with the substrate. In some examples, slurry based or liquid mixing processes may also be used to form CMAS resistant layer 22, and may include mixing of the powder prior to application on EBC layer 18. In some examples, a fusing process may be employed that melts and mixes the silicates prior to coating. After fusing, the melt may be crushed to the particle size desired for application to the substrate.

In some examples, the particles/powders may be pre-alloyed, e.g., with the RE monosilicates being mixed (pre reacted), and/or may be a mixture containing separate particles of RE monosilicates, and/or may be the individual material powders co-sprayed which each other (e.g., where the individual material powders are fed into the thermal spray torch separately and mix in the thermal spray torch/plasma).

Although not shown, in some examples, CMAS resistant layer 22 may be heat treated following the formation on EBC layer 18. For example, the as-deposited CMAS resistant layer may be comprised of amorphous and crystalline phases (e.g., about 10 vol. % to about 90 vol. % amorphous, e.g., about 40 vol. % amorphous). A heat treatment is performed to transform at least a portion of the amorphous phase to a crystalline phase.

EXAMPLES

As series of tests were performed to evaluate one or more aspects of some examples of the disclosure. However, the disclosure is not limited by the tests.

A first sample was prepared by forming a layer of Gd monosilicate, a single RE cation monosilicate composition. A second sample was prepared by forming a layer of La monosilicate, another single RE cation monosilicate composition. A third sample was prepared by forming a layer of (Gd,La) monosilicate, a mixed RE monosilicate. Each of the samples was then reacted with a CMAS composition. It was determined that the CMAS resistance of the mixed RE monosilicate composition was greater than the CMAS resistance of the single RE monosilicates. It was determined that the CTE of the mixed RE monosilicate composition was different than the CTE of the single RE monosilicates.

Various examples have been described. These and other examples are within the scope of the following claims and clauses.

Clause 1. An article comprising: a substrate; an environmental barrier coating (EBC) layer on the substrate; and a CMAS resistant layer on the EBC layer, wherein the CMAS layer includes a rare-earth (RE) monosilicate composition including a plurality of RE metal cations, wherein RE monosilicate composition is configured to react with CMAS to form a reaction product including a RE apatite phase with a $RE_2O_3 \cdot SiO_2$ composition, wherein the RE of the $RE_2O_3 \cdot SiO_2$ composition includes at least one of the plurality of RE metal cations of the RE monosilicate composition.

Clause 2. The article of clause 1, wherein the $RE_2O_3 \cdot SiO_2$ composition includes a $xRE_2O_3 \cdot ySiO_2$ composition, where a x:y ratio (x/y) is $0.5 < x/y < 1$.

Clause 3. The article of clauses 1 or 2, wherein the reaction product formed by the reaction of the RE monosilicate composition with the CMAS includes a primary apatite phase including at least one of the plurality of RE metal cations of the RE monosilicate.

Clause 4. The article of clause 3, wherein the CMAS includes a $SiO_2$-lean CMAS composition, and wherein the primary apatite phase formed by the reaction includes a $M_2RE_8(SiO_4)_6O_2$ composition, where M is Ca, Mg, Al, Fe, Ti, Ni, K, Zr, Hf, and/or Na.

Clause 5. The article of clause for 2, wherein the CMAS includes a $SiO_2$-rich CMAS composition, and wherein the reaction product formed by the reaction of the RE monosilicate composition with the CMAS includes a RE disilicate composition.

Clause 6. The article of any one of clauses 1-5, wherein the RE monosilicate composition includes one or more RE cations selected such that the CMAS resistant layer exhibits a coefficient of thermal expansion (CTE) that is within 3 ppm/K of the EBC layer.

Clause 7. The article of any one of clauses 1-6, wherein the reaction product includes a single RE metal cation of the plurality of metal cations of the RE monosilicate composition.

Clause 8. The article of any one of clauses 1-6, wherein the reaction product includes more than one RE metal cation of the plurality of metal cations of the RE monosilicate composition.

Clause 9. The article of any one of clauses 1-8, wherein the plurality of RE metal cations is three RE metal cations.

Clause 10. The article of any one of clauses 1-9, wherein the RE monosilicate composition is configured such that the RE apatite phase is stable from approximately 23 degrees Celsius to about 2000 degrees Celsius.

Clause 11. The article of any one of clauses 1-9, wherein the RE monosilicate composition is configured such that the RE apatite phase is stable at approximately 23 degrees Celsius.

Clause 12. The article of any one of clauses 1-11, wherein the RE apatite phase is configured to act as a barrier that reduces infiltration of the CMAS and/or reduces dissolution of the CMAS resistant layer to protect the EBC layer.

Clause 13. The article of any one of clauses 1-12, wherein the CMAS resistant layer consists essentially of the RE monosilicate.

Clause 14. The article of any one of clauses 1-12, wherein the CMAS resistant layer includes at least 20 vol. % of the RE monosilicate.

Clause 15. The article of clause 14, wherein a balance of the CMAS resistant layer includes a RE disilicate.

Clause 16. The article of any one of clauses 1-15, wherein the CMAS resistant layer includes one or more dopants configured to reduce the void volume of the CMAS resistant layer, wherein the dopants include at least one of $Al_2O_3$, $Fe_2O_3$, $Fe_3O_4$, $RE_2O_3$, $Ta_2O_5$, $HfO_2$, $ZrO_2$, CaO, MgO, SrO, $LiREO_2$ or $RE_3Al_5O_{12}$ (e.g. YbAG or YAG).

Clause 17. The article of any one of clauses 1-16, wherein the CMAS resistant layer is configured as an abradable layer on the EBC layer.

Clause 18. The article of any one of clauses 1-17, wherein the CMAS resistant layer exhibits a void volume of about 1 percent to about 50 percent.

Clause 19. The article of any one of clauses 1-16, wherein the CMAS resistant layer exhibits a void volume of about 0.1 percent to about 8 percent.

Clause 20. The article of any one of clauses 1-19, wherein the CMAS resistant layer include a first sub-layer and a second sub-layer, the first and second sub-layers having different microstructure.

Clause 21. The article of any one of clauses 1-20, further comprising a bond coat between the EBC layer and the substrate, wherein the bond coat includes silicon, a metal silicide, RE monosilicate, RE disilicate, hafnium silicate, mullite, SiC, a metal oxide, barium strontium aluminosilicate, $SiO_2$ or a mixture thereof.

Clause 22. The article of any one of clauses 1-21, wherein the plurality of RE metal cations includes three RE metal cations.

Clause 23. The article of any one of clauses 1-21, wherein the plurality of RE metal cations includes two RE metal cations.

Clause 24. The article of any one of clauses 1-22, wherein the plurality of RE metal cation includes at least one of lutetium (Lu), ytterbium (Yb), thulium (Tm), erbium (Er), holmium (Ho), dysprosium (Dy), gadolinium (Gd), terbium (Tb), europium (Eu), samarium (Sm), promethium (Pm), neodymium (Nd), praseodymium (Pr), cerium (Ce), lanthanum (La), yttrium (Y), or scandium (Sc).

Clause 25. A method comprising: forming an environmental barrier coating (EBC) layer on a substrate; and forming a CMAS resistant layer on the EBC layer, wherein the CMAS layer includes a rare-earth (RE) monosilicate composition including a plurality of RE metal cations, wherein RE monosilicate composition is configured to react with CMAS to form a reaction product including a RE apatite phase with a $RE_2O_3 \cdot SiO_2$ composition, wherein the RE of the $RE_2O_3 \cdot SiO_2$ composition includes at least one of the plurality of RE metal cations of the RE monosilicate.

Clause 26. The method of clause 25, wherein the $RE_2O_3 \cdot SiO_2$ composition includes a $xRE_2O_3 \cdot ySiO_2$ composition, where a x:y ratio (x/y) is $0.5<x/y<1$.

Clause 27. The method of clauses 25 or 26, wherein the reaction product formed by the reaction of the RE monosilicate composition with the CMAS includes a primary apatite phase including at least one of the plurality of RE metal cations of the RE monosilicate.

Clause 28. The method of clause 27, wherein the CMAS includes a $SiO_2$-lean CMAS composition, and wherein the primary apatite phase formed by the reaction includes a $M_2RE_8(SiO_4)_6O_2$ composition, where M is Ca, Mg, Al, Fe, Ti, Ni, K, Zr, Hf, and/or Na.

Clause 29. The method of clause 25 or 26, wherein the CMAS includes a $SiO_2$-rich CMAS composition, and wherein the reaction product formed by the reaction of the RE monosilicate composition with the CMAS includes a RE disilicate composition.

Clause 30. The method of any one of clauses 25-29, wherein the RE monosilicate composition includes one or more RE cations selected such that the CMAS resistant layer exhibits a coefficient of thermal expansion (CTE) that is within 3 ppm/K of the EBC layer.

Clause 31. The method of any one of clauses 25-30, wherein the reaction product includes a single RE metal cation of the plurality of metal cations of the RE monosilicate composition.

Clause 32. The method of any one of clauses 25-30, wherein the reaction product includes more than one RE metal cation of the plurality of metal cations of the RE monosilicate composition.

Clause 33. The method of any one of clauses 25-32, wherein the plurality of RE metal cations is three RE metal cations.

Clause 34. The method of any one of clauses 25-33, wherein the RE monosilicate composition is configured such that the RE apatite phase is stable from approximately 23 degrees Celsius to about 2000 degrees Celsius.

Clause 35. The method of any one of clauses 25-33, wherein the RE monosilicate composition is configured such that the RE apatite phase is stable at approximately 23 degrees Celsius.

Clause 36. The method of any one of clauses 25-11, wherein the RE apatite phase is configured to act as a barrier that reduces infiltration of the CMAS and/or reduces dissolution of the CMAS resistant layer to protect the EBC layer.

Clause 37. The method of any one of clauses 25-36, wherein the CMAS resistant layer consists essentially of the RE monosilicate.

Clause 38. The method of any one of clauses 25-36, wherein the CMAS resistant layer includes at least 20 vol. % of the RE monosilicate.

Clause 39. The method of clause 38, wherein a balance of the CMAS resistant layer includes a RE disilicate.

Clause 40. The method of any one of clauses 25-39, wherein the CMAS resistant layer includes one or more dopants configured to reduce the void volume of the CMAS resistant layer, wherein the dopants include at least one of $Al_2O_3$, $Fe_2O_3$, $Fe_3O_4$, $RE_2O_3$, $Ta_2O_5$, $HfO_2$, $ZrO_2$, CaO, MgO, SrO, $LiREO_2$ or $RE_3Al_5O_{12}$ (e.g. YbAG or YAG).

Clause 41. The method of any one of clauses 25-40, wherein the CMAS resistant layer is configured as an abradable layer on the EBC layer.

Clause 42. The method of any one of clauses 25-41, wherein the CMAS resistant layer exhibits a void volume of about 1 percent to about 50 percent.

Clause 43. The method of any one of clauses 25-41, wherein the CMAS resistant layer exhibits a void volume of about 0.1 percent to about 8 percent.

Clause 44. The method of any one of clauses 25-43, wherein the CMAS resistant layer include a first sub-layer and a second sub-layer, the first and second sub-layers having different microstructure.

Clause 45. The method of any one of clauses 25-44, further comprising a bond coat between the EBC layer and the substrate, wherein the bond coat includes silicon, a metal silicide, RE monosilicate, RE disilicate, hafnium silicate, mullite, SiC, a metal oxide, barium strontium aluminosilicate, $SiO_2$ or a mixture thereof.

Clause 46. The method of any one of clauses 25-45, wherein the plurality of RE metal cations includes three RE metal cations.

Clause 47. The method of any one of clauses 25-45, wherein the plurality of RE metal cations includes two RE metal cations.

Clause 48. The method of any one of clauses 25-47, wherein the plurality of RE metal cation includes at least one of lutetium (Lu), ytterbium (Yb), thulium (Tm), erbium (Er), holmium (Ho), dysprosium (Dy), gadolinium (Gd), terbium (Tb), europium (Eu), samarium (Sm), promethium (Pm), neodymium (Nd), praseodymium (Pr), cerium (Ce), lanthanum (La), yttrium (Y), or scandium (Sc).

Clause 49. A method comprising forming an article according to any one of clauses 1-24.

Clause 50. An article comprising: a substrate; an environmental barrier coating (EBC) layer on the substrate; and a CMAS resistant layer on the EBC layer, wherein the CMAS layer includes a rare-earth (RE) monosilicate composition including a plurality of RE metal cations, wherein RE monosilicate composition is configured to react with CMAS to form a reaction product including at least one of: a RE disilicate; a primary apatite phase including a $M_2RE_8(SiO_4)_6O_2$ composition, where M is Ca, Mg, Al, Fe, Ti, Ni, K, Zr, Hf, and/or Na; or a RE apatite phase with a $RE_2O_3 \cdot SiO_2$ composition, wherein the RE of the $RE_2O_3 \cdot SiO_2$ composition includes at least one of the plurality of RE metal cations of the RE monosilicate.

Clause 51. A method comprising: forming an environmental barrier coating (EBC) layer on a substrate; and forming a CMAS resistant layer on the EBC layer, wherein the CMAS layer includes a rare-earth (RE) monosilicate composition including a plurality of RE metal cations, wherein RE monosilicate composition is configured to react with CMAS to form a reaction product including at least one of: a RE disilicate; a primary apatite phase including a $M_2RE_8(SiO_4)_6O_2$ composition, where M is Ca, Mg, Al, Fe, Ti, Ni, K, Zr, Hf, and/or Na; or a RE apatite phase with a $RE_2O_3 \cdot SiO_2$ composition, wherein the RE of the $RE_2O_3 \cdot SiO_2$ composition includes at least one of the plurality of RE metal cations of the RE monosilicate.

Clause 52. An article according to any one of clauses 1-24 and 50, wherein the EBC layer includes a rare-earth (RE) disilicate composition including a plurality of RE metal cations.

Clause 53. The article of clause 52, wherein at least one of the plurality of RE metal cations of the RE disilicate are the same as the plurality of RE metal cations of the RE monosilicate.

What is claimed is:

1. An article comprising:
a substrate;
an environmental barrier coating (EBC) layer on the substrate; and
a CMAS resistant layer on the EBC layer, wherein the CMAS resistant layer consists essentially of a rare-earth (RE) monosilicate composition including a plurality of different RE metal cations, wherein the RE monosilicate composition comprises gadolinium and lanthanum and is configured to react with CMAS at a temperature of less than 1600 degrees Celsius to form a reaction product including a mixed RE apatite phase with a $RE_2O_3 \cdot SiO_2$ composition, wherein the RE of the $RE_2O_3 \cdot SiO_2$ composition includes at least two different RE metal cations of the plurality of RE metal cations of the RE monosilicate composition,
wherein the different RE metal cations are selected such that the mixed RE apatite phase is stable from about 23 degrees Celsius to about 1500 degrees Celsius, and wherein the CMAS resistant layer exhibits a coefficient of thermal expansion (CTE) that is within 3 ppm/K of the EBC layer.

2. The article of claim 1, wherein the $RE_2O_3 \cdot SiO_2$ composition includes a $xRE_2O_3 \cdot ySiO_2$ composition, where a x:y ratio (x/y) is $0.5 < x/y < 1$.

3. The article of claim 1, wherein the reaction product formed by the reaction of the RE monosilicate composition with the CMAS includes a primary apatite phase, wherein the primary apatite phase has a $M_2RE_8(SiO_4)_6O_2$ composition where M is M is Ca, Mg, Al, Fe, Ti, Ni, K, Zr, Hf, and/or Na.

4. The article of claim 3, wherein the CMAS includes a $SiO_2$-lean CMAS composition, and wherein the primary apatite phase formed by the reaction includes a $M_2RE_8(SiO_4)_6O_2$ composition, where M is Ca, Mg, Al, Fe, Ti, Ni, K, Zr, Hf, and/or Na.

5. The article of claim 1, further comprising the CMAS, wherein the CMAS includes a $SiO_2$-rich CMAS composition, and the reaction product, wherein the reaction product formed by the reaction of the RE monosilicate composition with the CMAS includes a RE disilicate composition.

6. The article of claim 1, wherein the RE apatite phase is configured to act as a barrier that reduces infiltration of the CMAS and/or reduces dissolution of the CMAS resistant layer to protect the EBC layer.

7. The article of claim 1, wherein the CMAS resistant layer exhibits a void volume of about 0.1 percent to about 8 percent.

8. The article of claim 1, wherein the CMAS resistant layer include a first sub-layer and a second sub-layer, the first and second sub-layers having different microstructure.

9. A method comprising:
forming an environmental barrier coating (EBC) layer on a substrate; and
forming a CMAS resistant layer on the EBC layer, wherein the CMAS resistant layer consists essentially of a rare-earth (RE) monosilicate composition including a plurality of different RE metal cations, wherein RE monosilicate composition comprises gadolinium and lanthanum and is configured to react with CMAS at a temperature of less than 1600 degrees Celsius to form a reaction product including a mixed RE apatite phase with a $RE_2O_3 \cdot SiO_2$ composition, wherein the RE of the $RE_2O_3 \cdot SiO_2$ composition includes at least two of the plurality of RE metal cations of the RE monosilicate,
wherein the different RE metal cations are selected such that the mixed RE apatite phase is stable from about 23 degrees Celsius to about 1500 degrees Celsius, and wherein the CMAS resistant layer exhibits a coefficient of thermal expansion (CTE) that is within 3 ppm/K of the EBC layer.

10. An article comprising:
a substrate;
an environmental barrier coating (EBC) layer on the substrate;
a CMAS resistant layer on the EBC layer, wherein the CMAS resistant layer consists essentially of a rare-earth (RE) monosilicate composition including a plurality of different RE metal cations, wherein the RE monosilicate composition comprises gadolinium and lanthanum and is configured to react with CMAS at a temperature of less than 1600 degrees Celsius to form a reaction product; and
the reaction product, wherein the reaction product includes a RE apatite phase with a $RE_2O_3 \cdot SiO_2$ composition, wherein the RE of the $RE_2O_3 \cdot SiO_2$ composition includes at least two different RE metal cations of the plurality of RE metal cations of the RE monosilicate,
wherein the different RE metal cations are selected such that the mixed RE apatite phase is stable from about 23 degrees Celsius to about 1500 degrees Celsius, and wherein the CMAS resistant layer exhibits a coefficient of thermal expansion (CTE) that is within 3 ppm/K of the EBC layer.

* * * * *